US010627814B2

(12) United States Patent
Schweikl

(10) Patent No.: US 10,627,814 B2
(45) Date of Patent: Apr. 21, 2020

(54) SYSTEM AND METHOD FOR INFLUENCING VEHICLE SYSTEMS BY TAKING RELEVANT SIGNAL GENERATORS INTO ACCOUNT

(71) Applicant: Bayerische Motoren Werke Aktiengesellschaft, Munich (DE)

(72) Inventor: Johann Schweikl, Munich (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 181 days.

(21) Appl. No.: 15/366,111

(22) Filed: Dec. 1, 2016

(65) Prior Publication Data
US 2017/0160743 A1 Jun. 8, 2017

(30) Foreign Application Priority Data

Dec. 2, 2015 (DE) .................. 10 2015 224 112

(51) Int. Cl.
*G05D 1/00* (2006.01)
*G08G 1/056* (2006.01)
*G08G 1/0962* (2006.01)
*G06K 9/00* (2006.01)
*G08G 1/09* (2006.01)

(52) U.S. Cl.
CPC ....... *G05D 1/0088* (2013.01); *G06K 9/00825* (2013.01); *G08G 1/056* (2013.01); *G08G 1/091* (2013.01); *G08G 1/09623* (2013.01); *G08G 1/09626* (2013.01); *G05D 2201/0213* (2013.01)

(58) Field of Classification Search
CPC ......... G05D 1/0088; G05D 2201/0213; G08G 1/09626; G08G 1/09623; G08G 1/056; G08G 1/091; G06K 9/00825
See application file for complete search history.

(56) References Cited

U.S. PATENT DOCUMENTS 8,892,356 B1 * 11/2014 Weiland ............. G01C 21/3658
701/431
9,158,980 B1 * 10/2015 Ferguson ........... G06K 9/00825
(Continued)

FOREIGN PATENT DOCUMENTS

DE 10 2004 010 197 A1 9/2005
DE 601 06 794 T2 11/2005
(Continued)

OTHER PUBLICATIONS

German Search Report issued in counterpart German Application No. 10 2015 224 112.2 dated Sep. 26, 2016 with partial English translation (14 pages).

*Primary Examiner* — Adam R Mott
(74) *Attorney, Agent, or Firm* — Crowell & Moring LLP

(57) ABSTRACT

A system and method are provided for influencing vehicle systems while taking into account relevant signal generators, particularly relevant signal generator condition signals. A determination unit identifies relevant signal generators and/or their signal generator condition signals and an output unit generates an output signal to a vehicle system as a function of the result of the determination unit. The determination unit for the identification of relevant signal generators and/or relevant signal generator condition signals takes into account information concerning identified concealed signal generators.

13 Claims, 3 Drawing Sheets

(56) References Cited

U.S. PATENT DOCUMENTS

2001/0034575 A1    10/2001  Takenaga et al.
2009/0312888 A1    12/2009  Sickert et al.
2018/0012088 A1*    1/2018  Matsuo .................. G01C 21/26

FOREIGN PATENT DOCUMENTS

| DE | 10 2008 010 968 A1 | 9/2009 |
| DE | 10 2011 113 019 A1 | 5/2012 |
| DE | 10 2015 003 847 A1 | 8/2015 |
| DE | 10 2015 005 222 A1 | 12/2015 |

* cited by examiner

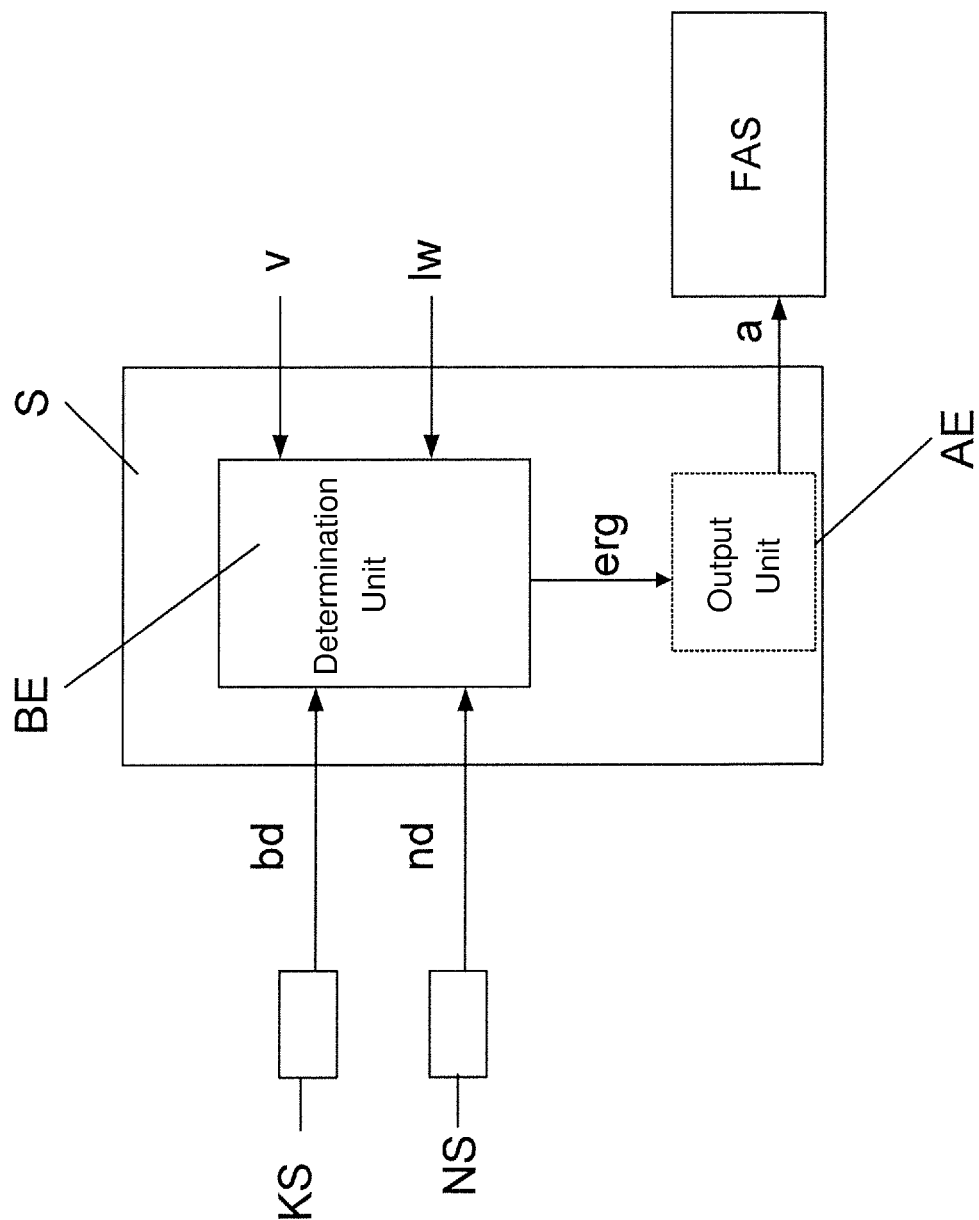

SYSTEM AND METHOD FOR INFLUENCING VEHICLE SYSTEMS BY TAKING RELEVANT SIGNAL GENERATORS INTO ACCOUNT

CROSS REFERENCE TO RELATED APPLICATIONS

This application claims priority under 35 U.S.C. § 119 from German Patent Application No. 10 2015 224 112.2, filed Dec. 2, 2015, the entire disclosure of which is herein expressly incorporated by reference.

BACKGROUND AND SUMMARY OF THE INVENTION

The invention relates to a system and method for influencing vehicle systems by taking relevant signal generators into account.

Various driver assistance systems are known from the state of the art which assist the driver in his driving task and which detect signal generators lying ahead, such as traffic lights or their light condition and take the latter into account when controlling the driver assistance systems.

For example, German Patent document DE 10 2008 010 968 A1 discloses a system for displaying information in a vehicle having an image detection unit for detecting the vehicle surroundings, an analyzing unit for analyzing the image data with respect to the presence of traffic signs or traffic devices, and a display unit for displaying information when at least one traffic sign or traffic device is detected. With respect to details, the system is characterized in that, as a function of the current or planned travel route, adapted information is displayed when different traffic signs or different traffic devices are detected for different travel route possibilities.

It is an object of the invention to provide a system and method for influencing vehicle systems in view of the recognition of relevant signal generators.

This and other objects are achieved by a system and method for influencing vehicle systems by taking relevant signal generators into account, particularly relevant signal generator condition signals, having a determination unit for identifying relevant signal generators and/or their signal generator condition signals and an output unit for generating an output signal to a vehicle system as a function of the result of the determination unit. The determination unit for the identification of relevant signal generators and/or relevant signal generator condition signals takes into account information concerning identified concealed signal generators.

The invention is based on the recognition that oftentimes traffic situations may occur in normal road operation in which one or more traffic lights are temporarily or even lastingly hidden. This may, for example, occur in the case of multilane roads when a large object, such as a truck, is situated between the own vehicle and the traffic light, so that the view of the traffic light is concealed. In the case of the above-described system known from the state of the art, such concealed traffic lights are not taken into account at all because they cannot be recognized by the camera.

According to the invention, a system and method for influencing vehicle systems while taking into account relevant signal generators, particularly relevant signal generator condition signals, having a determination unit for identifying relevant signal generators and/or their signal generator condition signals and an output unit for generating an output signal to a vehicle system as a function of the result of the determination unit are therefore provided, wherein the determination unit for the identification of relevant signal generators and/or relevant signal generator condition signals takes into account information concerning identified (temporarily and/or lastingly) concealed signal generators. In other words, when identifying the relevant signal generators, not only currently visible signal generators but also available information concerning currently concealed signal generators is taken into account.

This is necessary for avoiding a malfunction of the traffic-light-dependent functions or vehicle systems.

When information concerning at least one identified concealed signal generator is available to the determination unit, the latter is equipped in an advantageous embodiment in order to determine whether the concealed signal generator is or could be a relevant concealed signal generator. In the simplest form, this determination can take place such that the determination unit is equipped for, in the case of available information concerning an identified concealed signal generator, identifying a concealed signal generator as relevant if none of the not concealed identified signal generators can be identified as being relevant.

With respect to identifying relevant signal generators and/or their signal generator condition signals, the determination unit can advantageously be equipped, for the identification of relevant signal generators and/or their signal generator condition signals, particularly relevant not concealed signal generators and/or their signal generator condition signals, while taking into account all known signal generators, to carry out at least one, preferably at least two or all of the following steps:

Identifying a signal-generator-relevant traffic situation lying ahead;
  assigning the signal generators relevant to a, or this, signal-generator-relevant traffic situation to this traffic situation;
identifying of signal generator groups pertaining to this traffic situation;
  assigning to an identified signal generator group signal generators recognized as relevant to this traffic situation;
assigning the signal generator groups to conceivable driving maneuvers in the case of this traffic situation;
determining the desired or assumed driving maneuver of the motor vehicle in the case of this traffic situation; and/or
determining the signal generator group relevant to the driving maneuver of the motor vehicle and/or the signal generator condition signals relevant to the driving maneuver of the motor vehicle while taking into account the desired or assumed driving maneuver of the motor vehicle.

A concrete approach to identifying relevant signal generators is described in the later description of the figures.

In order to be able to identify concealed signal generators at all, the determination unit (or an investigating unit placed outside the determination unit) may be designed for detecting and correspondingly analyzing data relevant in view of the identification of concealed signal generators.

Thus, in a particularly advantageous further development of the invention, concealed signal generators can be identified by the collection and analysis of relevant image data of a camera system monitoring the vehicle surroundings. With respect to details, a concealed signal generator can, for example, be identified when, in the case of a known position of the signal generator, no signal generator can be recognized from the image data of a camera in the region of the known position of the signal generator.

Basically, the position of unconcealed signal generators can most easily be determined by analyzing the image data of a camera surround detection system. When a signal generator is recognized by way of the image data of the camera, the position of the signal generator can very easily be determined while taking into account the alignment of the camera and the position of the vehicle. As an alternative or in addition, the position of a signal generator can also be determined or made plausible from map data, signal generator position statistical data and/or from Car-to-X data transmitted from outside the vehicle. Thus, for example, buy use of a memory unit, a statistic can be established from available information, as to the height and the distance from the road at which the signal generators are usually installed in the current country and/or in a community or city. This statistic can also be implemented as a function of speed and/or road classifications (residential urban, rural, highway, etc.) of the participating road segments.

However, it is problematic when at first a signal generator or its position (or its relative position) could be determined but later the signal generator can no longer be recognized or made plausible from the image data of the camera. The reason for the above may be that the own motor vehicle has moved along and, as a result of the continued travel, an object is situated between the vehicle and the signal generator, or that, although the own motor vehicle has stopped (or continues to drive), a moved object has moved between the motor vehicle and the signal generator.

In order to be able to now ensure that, for the identification of a concealed signal generator, the previously determined position of the signal generator will be used as the further basis, for determining the position or for maintaining the monitoring of the correct region, in which the signal generator should be visible in the camera image, a position determined at least once has to be continuously monitored during the approach operation to this signal generator. Advantageously, for example, for determining the position of an at first recognized signal generator or for maintaining the monitoring of the correct region, in which the signal generator would have to be visible in the camera image, a position determined at least once during the approach operation to this signal generator can to be monitored by monitoring the position of the signal generator relative to the motor vehicle. In this case, the relative position of the signal generator can be monitored as a function of known vehicle parameters, particularly as a function of known parameters influencing the position of the motor vehicle relative to the signal generator, more particularly as a function of the vehicle speed, the steering angle and/or the yaw rate of the vehicle. Therefore, when at first a signal generator lying ahead and its position is recognized at least once, by use of known vehicle parameters, such as the own speed, the steering angle and/or the yaw rate, the position of the signal generator relative to the motor vehicle is predicted, and the image data of the camera oriented to this region are analyzed as to whether the signal generator is visible.

If now, during the course of the determination method for identifying relevant signal generators, no unconcealed traffic light is classified as being relevant and, in addition, at least one concealed traffic light is identified, it can be assumed that at least one of the concealed traffic lights is relevant or could be relevant to the driving maneuver of the own vehicle. Since, because of the concealment of the signal generator, no qualified statement can be made concerning the current condition of the concealed signal generator (and therefore also—if required—no anticipatory statement concerning the condition of the signal generator), the output unit is advantageously designed for, in the case of an identified relevant concealed signal generator, generating a corresponding output signal, in the case of an identified relevant concealed signal generator, so that the vehicle system taking into account the condition of a signal generator receives a corresponding indication that, in the current condition, no qualified statement can be made concerning the condition of the relevant (concealed) signal generator.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 1 is a schematic block diagram of a very simplified structure of a system for influencing a vehicle system while taking into account relevant signal generators.

DETAILED DESCRIPTION OF THE DRAWINGS

Figure 2A:
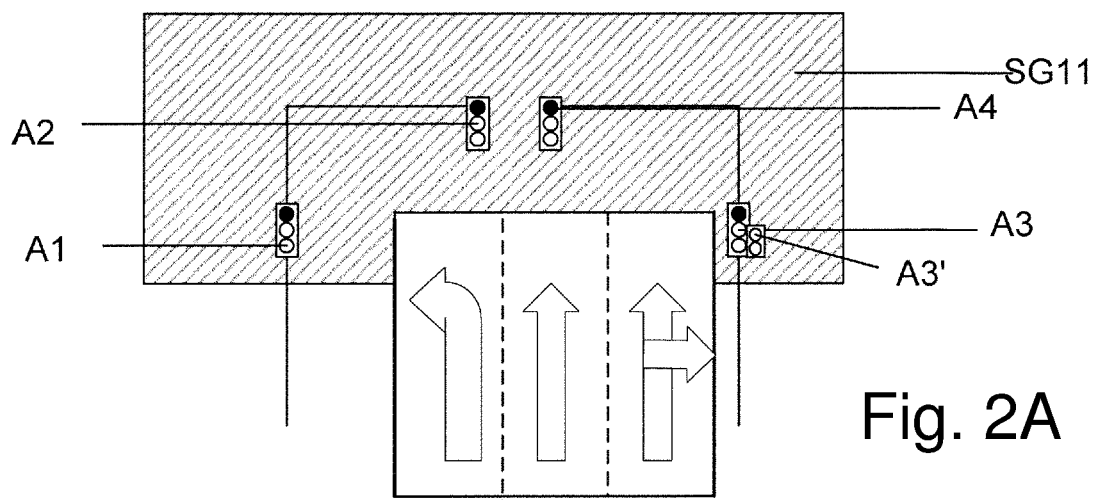
FIGS. 2A-2C are examples of a traffic situation with different traffic light settings for illustrating different signal groups.

The system S illustrated in FIG. 1 for influencing a vehicle system FAS includes a determination unit BE for identifying relevant signal generators and their signal generator condition signals, and an output unit AE for generating an output signal to the vehicle system FAS as a function of the result erg of the determination unit BE. For identifying relevant signal generators and their signal generator condition signals, the determination unit BE collects the following data, among others: Image data bd of a camera system KS monitoring a vehicle surroundings, navigation data nd of a navigation system NS, data concerning the current speed v and the current steering angle lw of the motor vehicle. In addition, a connection to back-end data can also be established by way of a so-called car-to-X communication interface, which back-end data can then also be taken into account in addition or as an alternative. A statistic for the position of the traffic lights in a defined location can then be prepared either vehicle-internally on the basis of the observations of the ego vehicle, or in the back-end on the basis of the observations of other vehicles. In the latter case, instead of the data to be analyzed, information concerning the probable position can already be transmitted to the vehicle.

In the following, a concrete methodology can be illustrated for the determination of relevant signal generators and their signal generator condition signals while taking into account available information concerning identified concealed signal generators. The method has the object of identifying the traffic light(s) relevant to the own driving lane/driving direction in order to, based on this knowledge, be able to improve safety and/or comfort functions of vehicle systems FAS. The processing of the present data bd nd, v and lw (under ideal conditions) can take place in the following steps:

1. Intersection Assignment:

This step essentially contains the two sub-steps of "identifying a signal-generator-relevant traffic situation lying ahead" and "assigning the signal generators relevant to this signal-generator-relevant traffic situation to this traffic situation." The first sub-step takes place by analyzing available navigation data and, as applicable, while taking into account a desired or assumed driving route. For example, an intersection lying ahead, which the vehicle is approaching, can be identified from the navigation data nd.

In the second sub-step, it is necessary to assign the individual signal generators (=traffic lights) to the identified intersection. For this purpose, the distances to the individual signal generators detected by the camera KS are compared with the distance to the next intersection from the navigation device NS. In addition, country-specific peculiarities are to be taken into account on the basis of the country state code of the traversed country from the navigation device NS (for example, a traffic light situated on the opposite side of the street in the U.S.). In this manner, it becomes possible to differentiate the signal generators of the intersection lying ahead from other signal generators within the focus of the camera KS. The information concerning the traffic lights not relevant to this intersection does not have to be taken into account in the following.

2. Identification of Signal Groups and Assigning of Signal Groups to Conceivable Driving Maneuvers:

The number of signal generators is relevant to the classification of an intersection situation. The signal generators of a signal group have the same color and are of the same type (for example, signal generators with a direction arrow). One or more signal generators may be combined in one signal group. When several signal generators are within the focus of the camera KS for an extended period of time, a function can observe the respective colors of the signal generators and form signal groups. All signal generators which have the same color and the same direction information belong to one signal group. When one or more signal generators change their colors, they are assigned to further signal groups. As the observation duration increases, the number of recognized signal groups will converge. Signal generators in different signal groups, as a rule, apply to different turning directions. Thus, usually several signal generators for one direction (particularly straight ahead) are present on multilane roads. Signal generators for turning lanes are usually timed differently, so that these can be assigned to different signal groups.

When the view is unrestricted, the signal groups can therefore be identified by the recognition of the traffic lights (including those with direction arrows) and, in reconciliation with a digital map from the navigation system NS, can be assigned to the individual road segments.

3. Determination of the Own Travel Direction:

The desired travel direction of the vehicle can be estimated by a routing by use of the navigation system NS, route estimators, direction indicators, viewing direction detection of the driver, etc., and evaluation of the own driving lane on the basis of map data nd and/or by use of lane recognition by camera KS, etc. By way of this information, a differentiation can be made of whether a turning operation will take place or the intersection is just being crossed.

4. Determination of Relevant Signal Generators:

From the number of lanes, the number of signal groups, the position of the signal generators in relation to the ego vehicle, the own driving direction (see above) and the own lane (with the aid of map data ns, lane recognition by camera KS, etc.), the relevant signal generator (or the relevant signal generator group) can therefore be identified for the own motor vehicle. In addition, when all of the current signal groups are known, also when individual signal generators are concealed, a conclusion can be drawn regarding the color of the invisible signal generators, if an additional signal generator in the same signal group is detected by the camera KS. In addition, the method of forming signal groups is advantageous when signal generators for turnoff lanes (as a rule, with a direction arrow) cannot be reliably recognized from far away.

For this described basic method, it is required that, during the approach to an intersection situation, all signal generators can be detected and assigned to signal groups. In the case of a local concealment, additional steps will be necessary. In order to avoid a malfunction of traffic-light-dependent functions, a concealment of signal generators has to be reliably detected.

For this purpose, it was found to be advantageous for the position of a signal generator to be continuously monitored during the approach operation. The position of a signal generator relative to the own motor vehicle can be determined from the image data bd of the camera KS. With the aid of known vehicle parameters, such as the speed v, the steering angle lw, the yaw rate, etc., the movement of the signal generator in the image camera KS can be predicted or made plausible.

The signal generator may be concealed by static as well as dynamic objects in the image of the camera KS. In both cases, a new object may be detected in the region of the monitored signal generator at the latest shortly before the concealment. The position and the speed relative to the own motor vehicle can be determined also for this new object. It can be estimated therefrom whether the concealment will be temporary or lasting.

A lasting concealment can, for example, be assumed when the concealing object (for example, a truck) is moving toward a signal generator at approximately the same speed as the own motor vehicle. As a function of the residual signal generators within the focus of the camera KS, the lasting concealment may have the result that the relevant traffic light cannot be determined or detected for a defined travel direction.

In the case of a temporary concealment, by means of the prediction of the movement directions of the signal generator and the concealing object, in the image of the camera KS, the image area may also be determined in which the concealed signal generator will most probably become visible again. When this area is no longer covered by the aperture angle of the camera KS, similarly to the case of the lasting concealment, the determination of the relevant traffic light will no longer be ensured.

In the event that, during the approach to an intersection situation, a signal generator was never in the focus of the camera, a concealment can be checked on the basis of estimated signal generator positions. Thus, by way of a memory unit, a statistic can, for example, be established as to the height and as to the lateral distance from the road, by which the signal generators are usually installed in this country, this city, community, etc. This statistic can also be conducted as a function of speed and road classifications (residential, urban, rural, highway, etc.) of the participating road segments. When these areas are concealed by other objects, a concealment of the signal generator can be assumed. This assumption becomes clearer when the corresponding positions of the signal generators are stored in the map of the navigation system NS. As an alternative, the input can come from other vehicles (so-called car-to-car communication), which have detected the signal generator position and made it available to the own motor vehicle by way of a back-end connection.

In all above-mentioned cases, the output unit AE can inform the active efficiency, safety or comfort functions of different vehicle systems FAS of the status of the concealment, in order to prevent a corresponding malfunction by a wrong traffic light selection. Particularly if, for the respective function, the absence of a reaction is less critical than a wrong reaction.

Advantageously, in the event of a temporary concealment, the point-in-time of the renewed detection of a signal generator can be estimated. The same applies to the location of the signal generator in the camera image. As a result, the recognition of the signal generator can be focused on this location by the image recognition algorithms, and the conceivable reaction of the efficiency, safety or comfort function can be prepared as a function of the color of the signal generator for the point-in-time of the recognition.

Figure 2B:
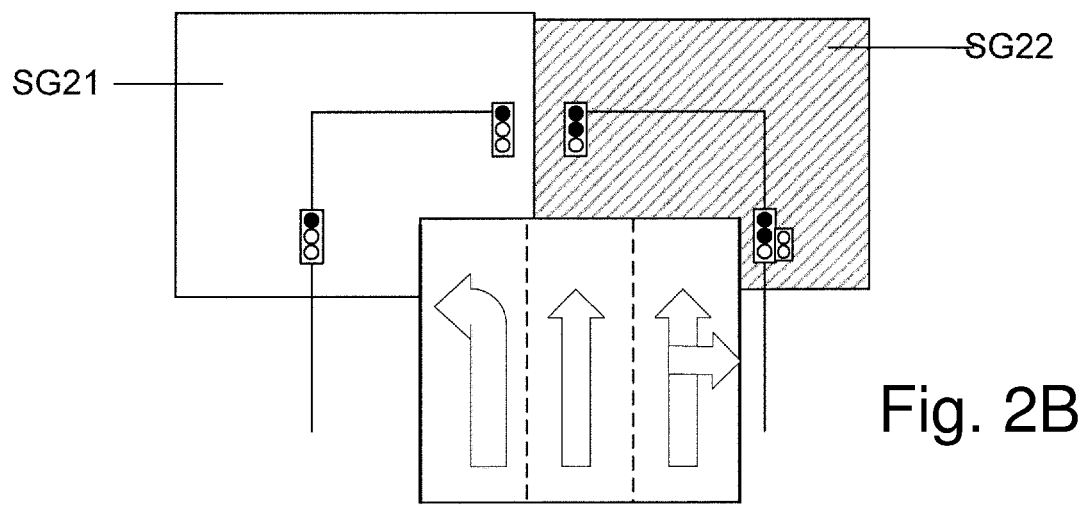
Figure 2C:
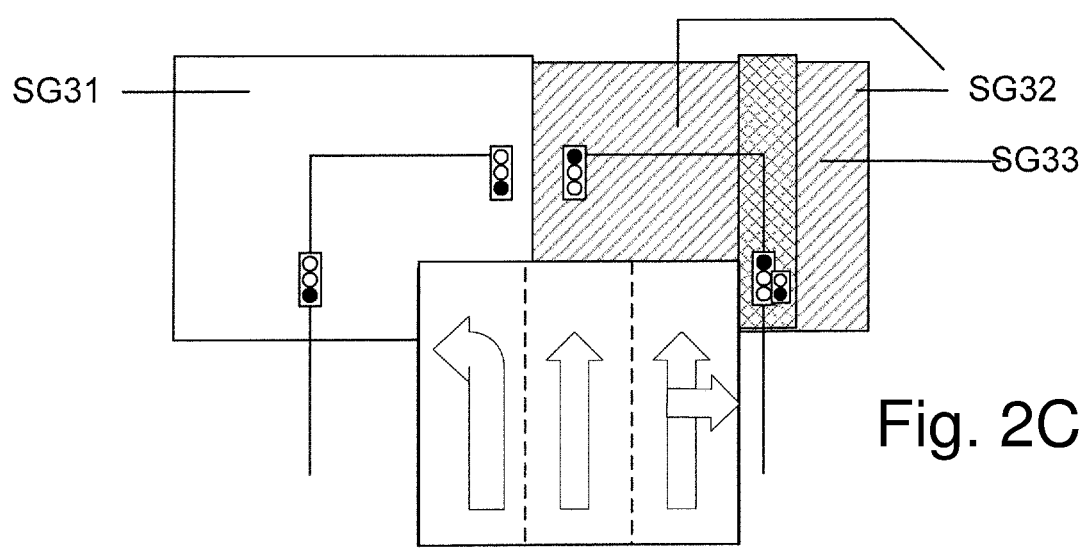

FIGS. 2A, 2B and 2C each show a traffic situation, in which, by observing the light signals of all traffic lights pertaining to this traffic situation for an extended time period, the various signal generator groups can be identified.

For one direction, the traffic situation shows a 3-lane road, wherein the left driving lane may be used only for left turn-offs, the center driving lane may be used only for straight-ahead driving, and the right driving lane may be used for straight-ahead driving and for right turn-offs. In the area of this intersection, traffic lights A1, A2, A3 and A4 are situated which are basically relevant to this direction 4. In addition, a traffic light A3' is also detected which is arranged directly next to the traffic light A3, which, however, at first emits no light signal.

When the observation duration is brief, the 4 signal generators A1, A2, A3 and A4 in FIG. 2A at first all exhibit the same color. At this point in time, a signal group SG11 therefore still has to be assumed for all driving maneuvers (left turn offs, straight-ahead driving, right turn-offs).

During a longer period of observation (FIG. 2B), it is recognized that the two traffic lights A1 and A2 continue to be red, while traffic lights A3 and A4 change to orange (yellow) or, in addition, are orange. Now, there is a situation where there are two signal generator groups SG21 and SG22, because it is currently recognized that the traffic lights A1-A4 control the traffic flow differently at least for two different driving maneuvers (driving maneuver 1: left turn-off; driving maneuver 2: right turn-off; and driving straight ahead).

When observing the traffic lights or their condition signals (FIG. 2C) even longer, it is recognized that now traffic light 3' also emits a light signal (green), while traffic lights A3 and A4 show red. In addition, traffic lights A1 and A2 are also switched to green. A situation with three signal generator groups SG31, SG32 and SG33 exists now because it is currently recognized that traffic lights A1-A4 (including traffic light A3') control the traffic flow differently for three different driving maneuvers (driving maneuver 1: left turn-offs; driving maneuver 2: straight-ahead driving; driving maneuver 3: right turn-offs).

Based on this observation over an extended period of time, as a function of the assumed driving maneuver of the vehicle, the relevant traffic light can be selected, its light signals can be observed, and a corresponding signal can be transmitted to corresponding driving functions. In this case, it can also be taken into account that, in the case of an assumed turn-off driving maneuver to the right while traffic light 3' is active, the latter is relevant, and when traffic light A3' is switched off, traffic lights A3 and A4 are relevant.

Figure 3B:
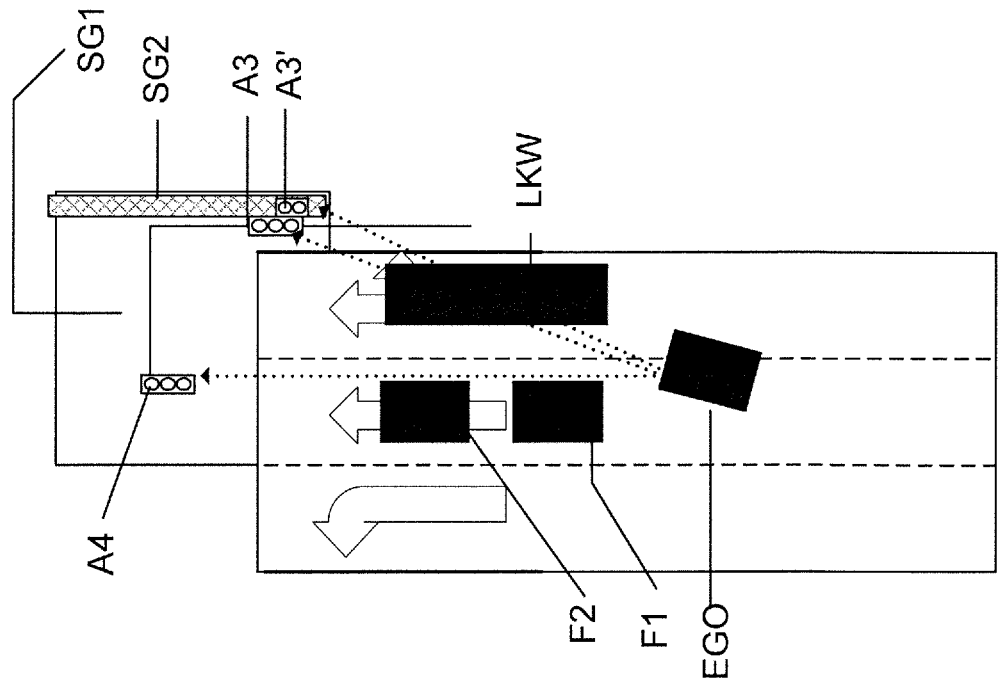
FIGS. 3A and 3B are examples of a traffic scenario with a concealed relevant traffic light.
Figure 3A:
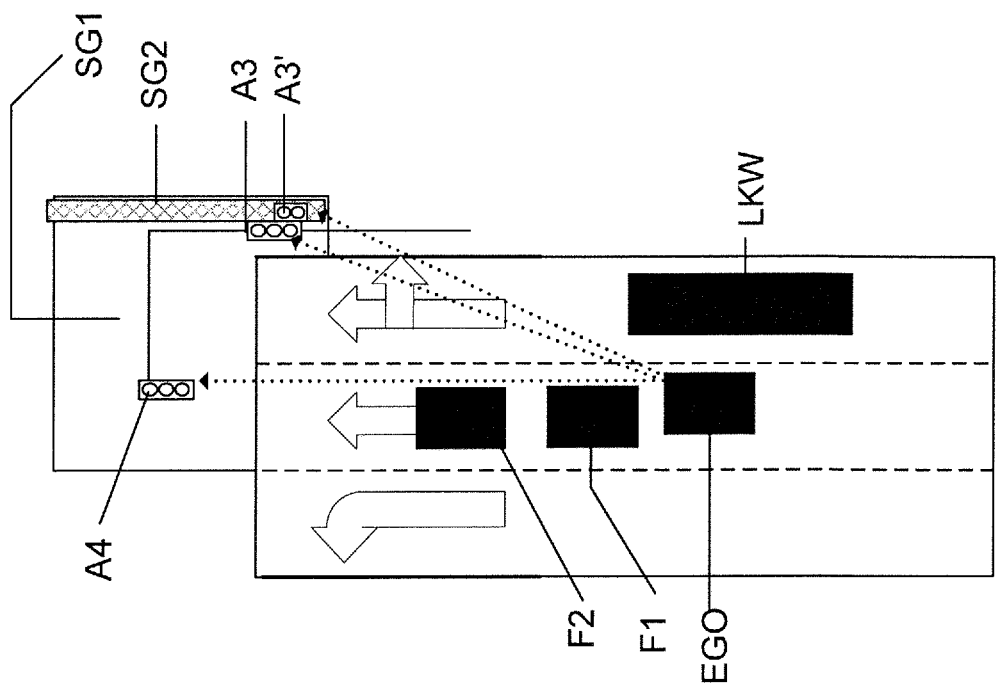

FIG. 3A now illustrates a traffic scenario with a clear view toward all traffic lights, and FIG. 3B illustrates a similar traffic scenario with a concealed relevant traffic light. The road system of these traffic scenarios corresponds to the traffic routing described in FIGS. 2A-2C. For reasons of simplification, only 3 of the 5 traffic lights, specifically traffic lights A3, A3' and A4 are shown. Analogous to FIGS. 2A-2C, traffic lights A3 and A4 pertain to a first signal group SG1 and traffic light A3' pertains to a second signal group SG2.

Various vehicles F1, F2, EGO and LKW are situated in front of the traffic lights, in which case the vehicle EGO is equipped with a determination unit for identifying relevant signal generators and/or their signal generator condition signals, while taking into account information concerning concealed signal generators.

In FIG. 3A, all possibly relevant traffic lights can be detected by the camera on the basis of the current traffic situation. During the further course of the traffic scene, the determination unit can determine that, because the vehicle LKW has driven further forward, traffic lights A3 and A3' are no longer visible. Therefore, these two traffic lights can be classified as still being present but being concealed.

Were the vehicle EGO to travel straight ahead, the detected concealment of the two traffic lights A3 and a3' could remain without consequences for the determination of the condition of the relevant traffic lights, because the determination had already recognized beforehand by observing of the traffic light switching that traffic light A4 is a relevant traffic light, and therefore its light signal is also relevant.

However, the determination unit now recognizes that the own vehicle EGO is initiating a lane change to the right lane, i.e. the vehicle EGO could possibly turn off to the right (FIG. 3B). However, as a result of the concealment of the traffic light A3', currently no information can be supplied concerning the light signal, and it is also not clear at the current point-in-time whether the vehicle EGO wants to drive straight ahead or turn off to the right. This is because no qualified information concerning the condition of the relevant traffic light can be obtained, since the relevant traffic light cannot be unambiguously identified. However, the determination unit can be further developed for determining by way of the relative movement data of the vehicle LKW with respect to the own vehicle EGO (and of the movement data of the own vehicle EGO), whether or when there again will be a visual connection of the camera to the traffic light A3'. When the driver of the vehicle EGO, after his change to the right lane, operates the direction signal, it can also be assumed with high probability that the driver of the vehicle EGO wants to turn off to the right behind the intersection. At the point in time at which the traffic lights A3 and A3' will probably be visible again, the determination unit can therefore identify the relevant traffic light, while taking into account the direction signal operation, and the output unit can transmit information concerning its condition or its next relevant condition change to the vehicle system processing this information. As an alternative, an active routing can also supply information on whether the driver wants to turn off, and a corresponding reaction can then take place.

This methodology can be used for the identification of the relevant signal generator for arbitrary efficiency, safety or comfort functions of vehicle systems. Thus, it is, for example, decisive for the idling control and recuperation functions whether an intersection can be traversed without delay or has to be delayed. By means of the above-obtained data, for example, the point in time for the switch-over between idle coasting and recuperation can be optimized with respect to efficiency. As a result, the portion of kinetic energy of the vehicle, which is converted to heat by the friction brake, is reduced and the fuel consumption is lowered.

In the case of an engine start-stop automatic system, by use of traffic light information, an automatic additional start in response to a traffic light that is turning green can be implemented. In the case of a line of cars in front of a traffic light, which is already green, a switching-off of the engine can be prevented because, in this case, the stoppage time will be very short.

With respect to safety functions, the right-of-way warner should be mentioned. This function can warn the driver when the latter, without any recognizable deceleration intention, approaches a red traffic light that is relevant to the EGO vehicle. In this case, the driver can be warned and a braking maneuver can possibly be prepared or initiated.

Furthermore, the above methodology for the recognition of concealments can also be applied to other situations. In this manner, the right-of-way warner can, for example, assess the concealment probability of stop signs or make plausible stop signs that are no longer visible as a result of concealing objects, and thereby protect against faulty detections.

By use of a similar approach, pedestrians exiting from a bus can also be detected before they possibly disappear in front of or behind the bus. From the movement data before the disappearance, the probable location and point-in-time of the reappearance can be predicted. In this manner, warning systems or brake assistants for avoiding collisions with suddenly appearing traffic participants can be enabled if the latter were detected by the camera prior to the concealment. With respect to comfort functions, the automatic cruise control (with and without ranging function) can be mentioned. While currently the set speed is maintained also at intersections and red traffic lights, with the aid of the selection of the relevant signal generator, the latter can be taken into account and, if required, the target speed can be adapted to zero.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of influencing vehicle systems by accounting for relevant signal generators, the method comprising the acts of:
    observing, by an image detection system of a vehicle, color change behavior for a plurality of signal generators;
    identifying, via a determination unit, that a signal generator of the plurality of signal generators has been concealed from the image detection system of the vehicle;
    estimating, via the determination unit, a point-in-time at which the identified concealed signal generator will be detectable by the image detection system of the vehicle, wherein the estimating is in advance of the point-in-time;
    identifying, via the determination unit, relevant signal generators based on observing, by the image detection system of the vehicle, that at least a color change behavior of the identified concealed signal generator matches a color change behavior of the identified relevant signal generators; and
    generating, via an output unit, an output signal to a vehicle system as a function of a result of the identifying of the relevant signal generators.

2. The method according to claim 1, wherein the relevant signal generators include relevant signal generator condition signals.

3. The method according to claim 2, further comprising the act of:
    when information concerning an identified concealed signal generator is available, determining, via the determination unit, whether the identified concealed signal generator is or could be a relevant concealed signal generator.

4. The method according to claim 3, wherein the act of determining whether the identified concealed signal generator is or could be a relevant concealed signal generator is carried out by identifying the identified concealed signal generator as relevant if none of any non-concealed identified signal generators are identified as being relevant.

5. The method according to claim 2, wherein the identifying, via the determination unit, of the relevant signal generators, while taking into account information concerning identified concealed signal generator comprises the following acts:
    identifying a signal-generator-relevant traffic situation lying ahead of the vehicle,
    assigning the signal generators relevant to a, or the, signal-generator-relevant traffic situation to said traffic situation,
    identifying of signal generator groups pertaining to said traffic situation,
    assigning to an identified signal generator group those signal generators relevant to said traffic situation,
    assigning the signal generator groups to conceivable driving maneuvers in a case of said traffic situation,
    determining a desired or an assumed driving maneuver of the vehicle in a case of said traffic situation, and
    determining the signal generator group relevant to a driving maneuver of the vehicle while taking in account the desired or the assumed driving maneuver of the vehicle.

6. The method according to claim 1, further comprising:
    identifying a concealed signal generator when, in a case of a known position of the signal generator, no signal generator is recognizable from image data from a camera in a region of the known position of the signal generator.

7. The method according to claim 6, further comprising:
    determining the position of a detected signal generator from the image data of the camera, from map data, from signal generator position statistic data, and/or from car-to-X data.

8. The method according to claim 7, wherein determining the position of the signal generator further comprises continuously monitoring the position of the signal generator during an approach operation to the signal generator.

9. The method according to claim 7, wherein determining the position of the signal generator further comprises monitoring the position of the signal generator during an approach operation to the signal generator by monitoring the position of the signal generator relative to the vehicle as a function of known vehicle parameters.

10. The method according to claim 9, wherein the known vehicle parameters comprise one or more of a vehicle speed, a steering angle and a yaw rate of the vehicle.

11. A system for influencing vehicle systems, the system comprising a determination unit and an output unit operatively configured to carry out the method of claim 1.

12. A system for influencing vehicle systems, comprising:
an image detection system configured to observe color change behavior for a plurality of signal generators; and
a controller that includes a processor and executes instructions to:
identify that a signal generator of the plurality of signal generators has been concealed from the image detection system of the vehicle;
estimate a point-in-time at which the identified concealed signal generator will be detectable by the image detection system of the vehicle, wherein the estimation is in advance of the point-in-time;
identify relevant signal generators based on observing, by the image detection system of the vehicle, that at least a color change behavior of the identified concealed signal generator matches a color change behavior of the identified relevant signal generators; and
generate an output signal to a vehicle system as a function of a result of the identifying of the relevant signal generators.

13. The method according to claim 1, further comprising generating, by the output unit, an output signal dependent on a traffic light that is an identified relevant concealed signal generator.

\* \* \* \* \*